United States Patent [19]

Titus

[11] Patent Number: 4,461,010

[45] Date of Patent: Jul. 17, 1984

[54] POWER SUPPLY CIRCUIT FOR A DIRECT CURRENT ARC FURNACE

[75] Inventor: Charles H. Titus, Newtown Square, Pa.

[73] Assignee: Electro-Petroleum, Inc., Wayne, Pa.

[21] Appl. No.: 402,991

[22] Filed: Jul. 29, 1982

[51] Int. Cl.³ .............................................. H05B 7/144
[52] U.S. Cl. ..................................................... 373/108
[58] Field of Search ....................... 373/108, 102, 104; 363/126, 52, 53, 10

[56] References Cited

U.S. PATENT DOCUMENTS

| | | | |
|---|---|---|---|
| 2,927,143 | 3/1960 | Jensen | 373/108 X |
| 3,104,352 | 9/1963 | Tiemann | 363/126 |
| 3,436,641 | 4/1969 | Biringer | 363/10 |
| 3,470,444 | 9/1969 | Bixby | 363/126 X |
| 3,789,127 | 1/1974 | Bowman | 373/108 |
| 3,812,620 | 5/1974 | Titus et al. | 48/65 |
| 4,099,227 | 7/1978 | Liptak | 363/126 |
| 4,110,821 | 8/1978 | Hisano | 363/126 X |

Primary Examiner—Roy N. Envall, Jr.
Attorney, Agent, or Firm—Dann, Dorfman, Herrell and Skillman

[57] ABSTRACT

A power supply circuit for providing a continuous DC arc between two electrodes of an electric arc furnace comprises a three-phase AC power source, transformer means having primary and secondary windings and three linear reactors. One of the outputs of a three-phase full-wave rectifier is connected to one of the furnace electrodes. The other output of the rectifier is connected through a DC inductance to the second furnace electrode. The linear reactors and the transformer means are connected in series between the AC power source and the rectifier.

21 Claims, 4 Drawing Figures

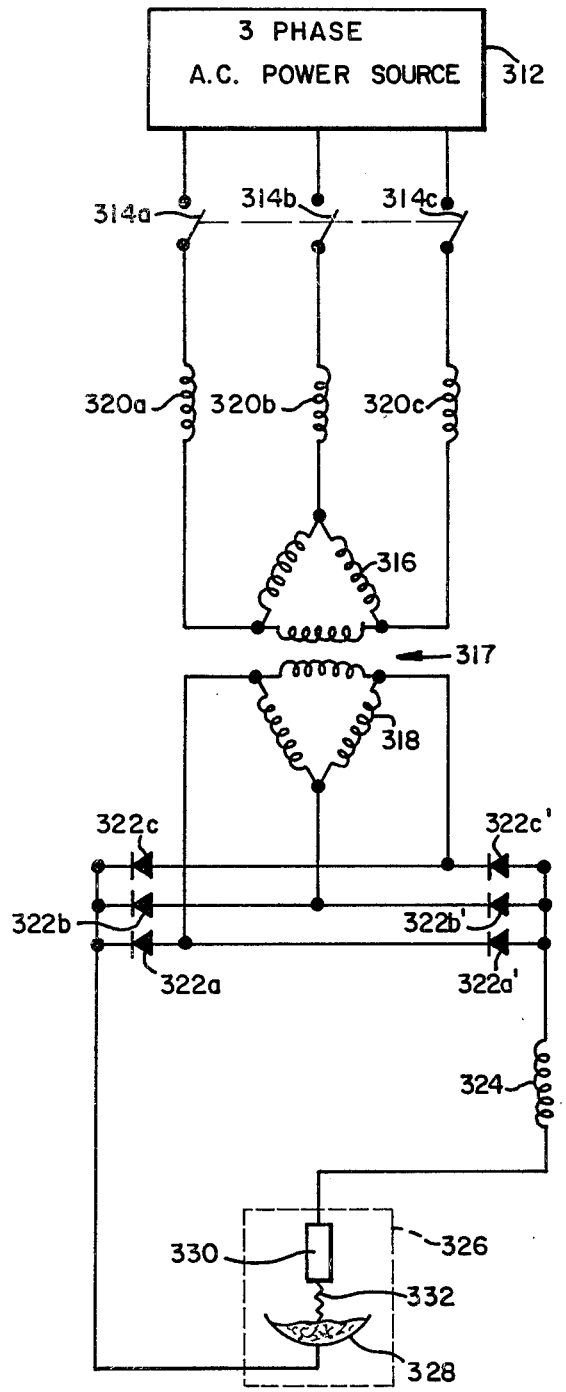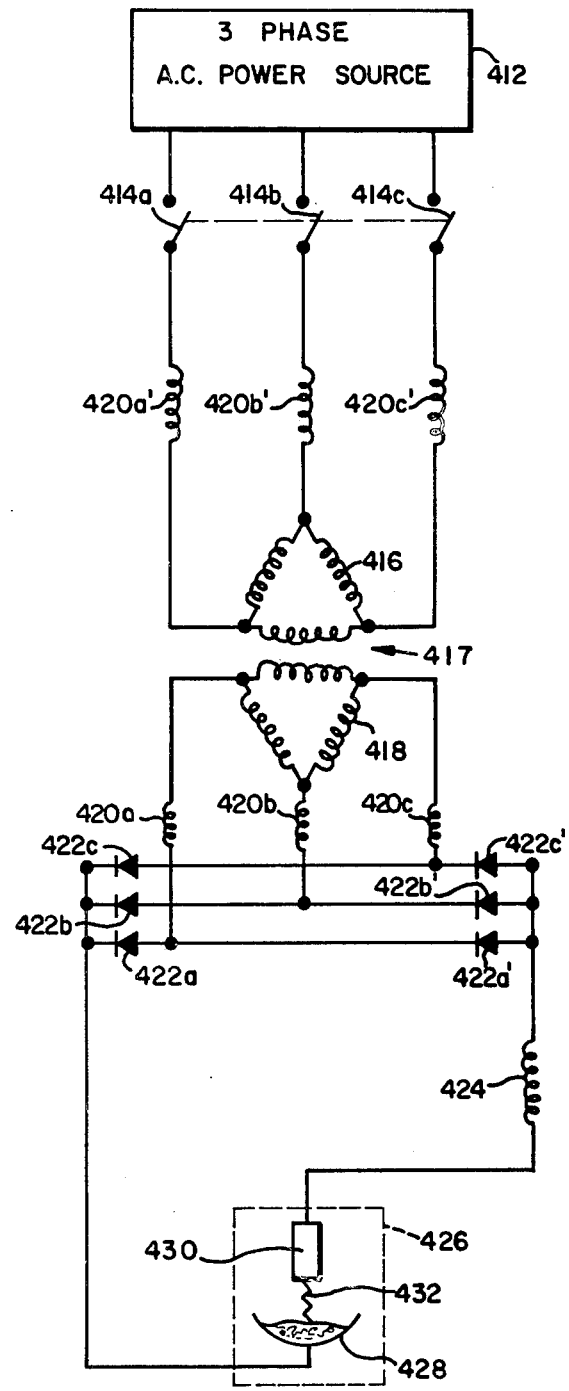
FIG. 3
FIG. 4

POWER SUPPLY CIRCUIT FOR A DIRECT CURRENT ARC FURNACE

BACKGROUND OF THE INVENTION

The present invention relates generally to a power supply circuit and, more particularly, to a power supply circuit for providing continuous DC arc current between two electrodes of an electric arc furnace.

DESCRIPTION OF THE PRIOR ART

Electric arc furnaces are normally used to melt and/or refine metals but may also be employed in different arts for various purposes. In many such applications, the stability of the electric arc is not of primary importance. If the arc extinguishes, it may easily be restarted by restriking it to the surface of, for example, the molten bath. In some applications, such as the destruction of hazardous materials, a stable arc having a uniform energy input to the system is required. Normal AC arcs are easily extinguished by the bursts of gas which are produced by the degradation of such hazardous materials. While AC arcs are sufficiently stable to melt various metals, it would be impractical to use AC arcs for the decomposition of hazardous waste since many of these materials have the ability to extinguish an AC in the vicinity of the natural current zeros which occur 120 times per second in a 60 hertz system. It is therefore advantageous to use a DC arc in such applications.

When a DC arc is employed in such applications, it is important to maintain a continuous, steady-state arc current to provide the requisite radiation and heating. Rapid increases or decreases in the arc current due to any sudden changes in arc resistance must also be minimized. In addition, arc extinction or instability due to fluctuations in the arc voltage which may be caused by physical and electromagnetic perturbations or chemical changes occurring within the furnace must be prevented. If in the course of decomposing hazardous materials the DC arc is not maintained in such a continuous steadystate condition or if the heat or radiation emitted by the arc fluctuates, decompositon of the hazardous materials may be incomplete, thereby resulting in the potential release of harmful products from the furnace.

Various prior art circuits have been employed to provide a DC arc having some of the above-described desirable characteristics. Among the prior art circuits have been circuits which included thyristor control employing suitable diode rectifiers, the use of saturable reactor control in connection with diode rectifiers and the use of phase controlled rectifiers. While the prior art circuits have achieved some success in providing a DC arc having the desired characteristics, such circuits have been found to be relatively complex and expensive to produce and maintain. In addition, such prior art circuits have accomplished automatic pre-set current regulation by phase control to cycle the current on and off during a given period. This type of current control can create stability problems with the DC arc since, at certain intervals during each cycle, a relatively low voltage is available.

The present invention comprises a more economical power supply circuit for providing a continuous DC arc between two electrodes of an electric arc furnace which employs linear reactors and preferably air core linear reactors to efficiently limit the current within the circuit and a DC inductance to provide a continuous arc having a relatively stable arc current even in the presence of severe transient perturbations in the vicinity of the arc.

SUMMARY OF THE INVENTION

Briefly stated, the present invention comprises a power supply circuit for providing a continuous DC arc between two electrodes of an electric arc furnace. The power supply circuit comprises a three-phase AC power source, transformer means having primary windings and secondary windings and first, second and third linear reactors. Rectifier means having three input terminals and first and second output terminals are included. One of the output terminals of the rectifier means is connected to one of the furnace electrodes. The other output of the rectifier means is connected through a DC inductance to the second furnace electrode. Circuit means are provided to connect the linear reactors and the transformer means in series between the AC power source and the rectifier means.

BRIEF DESCRIPTION OF THE DRAWING

The foregoing summary, as well as the following detailed description of a preferred embodiment, will be better understood when read in conjunction with the appended drawing, in which:

FIG. 3 is a schematic circuit diagram of a first alternate embodiment of the power supply circuit of FIG. 1; and FIG. 4 is a schematic circuit diagram of a second alternate embodiment of the power supply circuit of FIG. 1.

DESCRIPTION OF A PREFERRED AND ALTERNATE EMBODIMENTS

Figure 1:
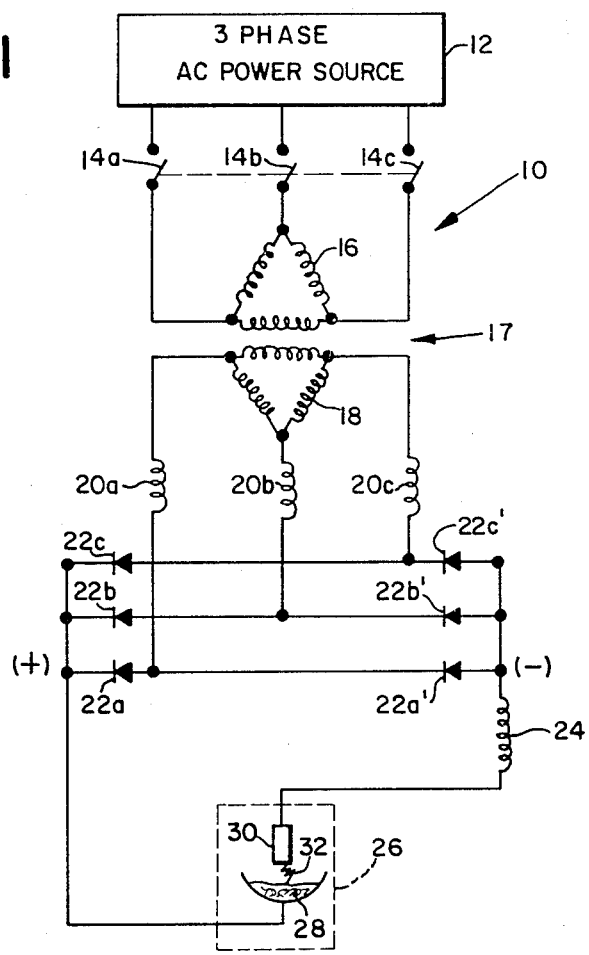
FIG. 1 is a schematic circuit diagram of the power supply circuit of the present invention.

Referring to FIG. 1, there is shown a power supply circuit (generally designated 10) for providing a continuous DC arc between two electrodes of an electric arc furnace in accordance with the present invention. A complete description of such an electric arc furnace may be obtained by referring to co-pending U.S. patent application Ser. No. 384,613, filed June 3, 1982 and entitled "Method and Apparatus for the Decomposition of Hazardous Materials and the Like", the disclosure of which is incorporated herein by reference.

The input of the power supply circuit 10 is connected in the conventional manner to a conventional three-phase AC power source 12 which may be any suitable conventional power source, such as a 13,800 volt power line from a commercial power company. The three-phase outputs of the power source 12 are connected through a switching means comprised of ganged individual switches 14a, 14b and 14c to the primary windings 16 of a transformer means 17, such as a conventional three-phase step-down transformer. In the present embodiment, the transformer means 17 comprises a three-phase transformer having both its primary windings 16 and its secondary windings 18 connected delta. However, it should be appreciated by those skilled in the art that the transformer means 17 could comprise three individual single-phase transformers (not shown) or could comprise a three-phase transformer having either or both of the windings 16 and 18 connected wye (not shown) without departing from the scope of the present invention. Moreover, the transformer means 17 may be of the three winding type wherein both the primary and secondary windings are of the wye type and the tertiary winding is of the delta type.

The nodes of the secondary transformer windings 18 are connected through first, second and third linear reactors 20a, 20b and 20c to a rectifier means 22, in the present embodiment a conventional three-phase full-wave solid state diode rectifier. In the present embodiment, the linear reactors 20a, 20b and 20c are air core reactors although other types of linear reactors may be employed. As shown, the diode rectifier 22 comprises a first pair of diodes 22a and 22a' connected to the first linear reactor 20a, a second pair of diodes 22b and 22b' connected to the second linear reactor 20b and a third pair of diodes 22c and 22c' connected to the third linear reactor 20c.

The rectifier 22 produces a positive DC output at the junction point of diodes 22a, 22b and 22c and a corresponding negative DC output at the junction of diodes 22a', 22b' and 22c'. The positive output from the rectifier 22 is connected directly to a first electrode 28 of the electric arc furnace 26. In the present embodiment, the first electrode 28 of the electric arc furnace 26 comprises a pool of molten conductive material such as metal, salts, or the like. A complete description of the structure and operation of electric arc furnace 26 may be obtained from the above-identified patent application.

The negative output of the rectifier 22 is connected through a DC inductance 24 to the second electrode 30 of the arc furnace 26. In the present embodiment, the second electrode 30 of the arc furnace 26 comprises a cylindrical conductor as shown.

In the operation of the circuit 10, when it is desired to create a DC arc 32 between the electrodes 28 and 30, the switches 14a, 14b and 14c are moved to the closed position (not shown) thereby causing current to flow through the primary windings 16 of the transformer 17. The flow of current through the primary transformer windings 16 induces a flow of current through the secondary transformer windings 18 in a manner as is well known in the art. Since the transformer in the present embodiment is a step-down transformer, the voltages in the secondary windings 18 will be less than the voltages in the primary windings 16 but the induced current flowing within the secondary windings will be increased over the current flowing through the primary windings.

The primary function of the relatively high impedance linear reactors 20a, 20b and 20c is to limit the low voltage AC current flowing into the diode rectifier 22 so that when the electrodes 28 and 30 are shorted, the DC short circuit current does not exceed the rated operating current by more than a predetermined amount, in this embodiment, two times the rated operating current. By proper selection of the reactors 20a, 20b and 20c, the DC short circuit current can be limited to two times the rated operating current. The reactors 20a, 20b and 20c also cause the AC current to lag the AC voltage to a greater degree as the length of the DC arc decreases. The inverse non-linear relationship between phase angle and DC arc length provides an automatic control of DC arc current within the required furnace current control limits.

The three-phase full wave diode rectifier 22 operates in the conventional manner to receive the three-phase AC from the secondary transformer windings 18 and rectify the AC to a DC voltage. The diode rectifier 22 is rated to withstand peak transient voltages equal to or greater than three times the rated operating voltage and at least two times the DC rated arc furnace current for controlled periods of time. The DC output from the rectifier 22 is employed to provide the DC arc 32 between the furnace electrodes 28 and 30.

The DC inductance 24 operates to promote arc stability by receiving and storing energy during the periods of time when the DC arc current is steady. Thereafter, if the arc resistance suddenly decreases due to chemical reactions or other environmental or arc perturbation conditions occurring within the furnace 26, the DC inductance 24 operates to limit the rate of rise of arc current for short periods of time. Alternatively, if the DC arc impedance suddenly increases for a short period of time, the DC inductance 24 operates to deliver extra energy and transient-voltage to the DC arc for short periods of time as required. In this manner, the DC inductance 24 operates to minimize any rapid changes of arc current, thereby stabilizing the arc 32 and improving arc efficiency. In operations such as the arc furnace described in the above-identified patent application arc stability is essential in order to provide for the complete destruction of the hazardous materials.

Figure 2:
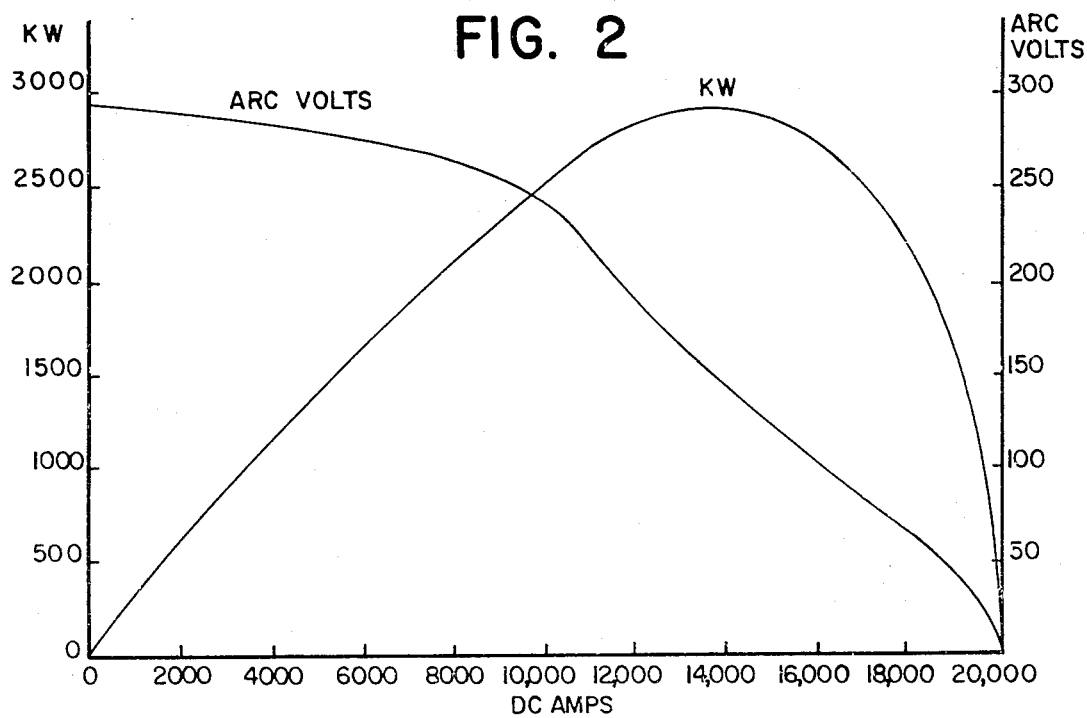
FIG. 2 is a graphic representation of the relationship between power output, arc voltage and arc current in the power supply circuit of FIG. 1.

FIG. 2 shows the relationship between arc voltage and DC current and also shows the interrelationship of arc voltage to KW energy into the furnace. The sustained DC arc voltage which substantially approaches the open circuit rectifier voltage will provide a significant amount of DC current in the arc in the furnace irrespectively of the amount of energy stored in reactors 20a, 20b, and 20c as well as in DC inductance 24 as shown in FIG. 1. Therefore, it can be concluded from FIG. 2 that if the furnace electrodes 28 and 30 are short-circuited and 20,000 amperes of current flows through the electrodes, then the KW energy input to the furnace 26 is zero and the arc voltage is also zero. As the electrodes are separated in the furnace and the arc voltage increases to a value approximately equal to one-half the open circuit rectifier voltage, the KW energy supplied by the arc increases to a maximum and then decreases at a relatively slow rate as the arc length becomes longer and the arc voltage increases. Thus, energy input to the furnace can be effectively controlled by simply controlling the length of the DC arc in the furnace.

It is also important to design (using known design techniques) the low voltage AC and DC portions of the power supply circuit 10 and the associated power rectifier 22 with a low distributed capacitance so that sufficient inductivity stored energy is available to keep the DC arc current substantially constant during rapid rates of change of arc voltage. If the capacitance of these elements is not kept relatively low, then the arc voltage may not rise at a sufficient rate to prevent arc instabilities in the furnace. It is highly desirable that the capacitance and inductance of the system be such that rates of rise of transient voltage in excess of 1 million volts per second be available at the arc furnace electrodes.

Referring now to FIG. 3, there is shown a schematic diagram of a first alternate embodiment of the power supply circuit of FIG. 1. In connection with FIG. 3, the components are given the same reference numerals as were given to the corresponding components of FIG. 1 but with the addition of the number "300" thereto.

As is readily apparent from FIG. 3, the power supply circuit of FIG. 3 is exactly the same as the power supply circuit of FIG. 1, except that the three linear reactors 320a, 320b and 320c are located on the primary side of the transformer means 317, rather than on the secondary side as was the case in connection with the power supply circuit of FIG. 1. Thus, the three-phase AC power source 312 is connected through the three ganged switches 314a, 314b and 314c and the three linear reactors 320a, 320b and 320c to the primary windings 316 of the transformer means 317. Again, although the transformer means 317 is shown to be a conventional three-phase transformer having both the primary windings 316 and the secondary windings 318 connected delta, it should be understood that the present invention is not limited to the use of such a transformer means 317.

The nodes of the secondary transformer windings 318 are connected to a rectifier means comprised of three pairs of semi-conductor diodes 322a and 322a', 322b and 322b', and 322c and 322c'. The positive output from the rectifier means is connected to a first electrode 328 of the electric furnace 326. The negative output of the rectifier means is connected through a DC inductance 324 to the second electrode 330 of the arc furnace 326.

The operation of the power supply circuit of FIG. 3 is substantially the same as the operation of the power supply circuit of FIG. 1 as described in detail above. However, since the linear reactors 320a, 320b and 320c are located on the primary side of the transformer means 317, the power supply circuit of FIG. 3 does not respond as rapidly to provide transient recovery voltage to the electric arc as is accomplished by the power supply circuit of FIG. 1.

Referring now to FIG. 4, there is shown a schematic circuit diagram of a second alternate embodiment of the power supply circuit of FIG. 1. In connection with FIG. 4, the components have been given the same reference numerals as were given to the corresponding components of FIG. 1 but with the addition of 400 thereto.

The power supply circuit of FIG. 4 is exactly the same as the circuit of FIG. 1, except for the addition of fourth, fifth and sixth reactors 420a', 420b' and 420c' in series between the three-phase AC power source 412 and the primary windings 416 of the transformer means 417. The reactance provided by reactors 420a', 420b' and 420c' may be accomplished through the use of an appropriate number of turns of suitably sized wires or conductors (not shown).

The operation of the power supply circuit of FIG. 4 is substantially the same as was set forth above in connection with FIG. 1, and therefore, will not be repeated here.

From the foregoing description of a preferred and two alternate embodiments, it can be seen that the present invention provides an efficient and inexpensive power supply circuit for providing a continuous, stable DC arc between two electrodes of an electric arc furnace. It will be recognized by those skilled in the art that changes may be made to the above-described embodiments without departing from the inventive concepts of the invention. It is understood, therefore, that this invention is not limited to the particular embodiments disclosed, but it is intended to cover all modifications which are within the scope and spirit of the invention defined by the appended claims.

I claim:

1. A power supply circuit for providing a continuous DC arc between two electrodes of an electric arc furnace, comprising:

a three-phase AC power source for providing an AC current and an AC voltage;

rectifier means having three input terminals and first and second output terminals, one of said electrodes being connected to the first output terminal of said rectifier means;

a DC inductance having a first terminal connected to the second output terminal of said rectifier means and a second terminal connected to the second of said electrodes;

transformer means having primary windings and secondary windings;

first, second and third linear reactors for producing a change in phase angle between the AC current and AC voltage in response to a change in DC arc length to control the DC arc current and power input to the furnace; and circuit means connecting the linear reactors and the transformer means in series between the AC power source and the rectifier means.

2. The power supply circuit as recited in claim 1 wherein the rectifier means is a diode rectifier means.

3. The power supply circuit as recited in claim 1 wherein the transformer means comprises a three-phase transformer.

4. The power supply circuit as recited in claim 3 wherein the rectifier means comprises a three-phase full-wave diode rectifier.

5. The power supply circuit as recited in claim 4 wherein the three-phase transformer includes delta-type primary and secondary windings.

6. The power supply circuit as recited in claims 1, 3, 4 or 5 wherein the linear reactors are connected between the AC power source and the primary windings of the transformer means and the rectifier means is connected to the secondary windings of the transformer.

7. The power supply circuit as recited in claim 5 and including fourth, fifth and sixth linear reactors wherein the fourth, fifth and sixth linear reactors are connected in series between the secondary windings of the transformer and the rectifier means.

8. A power supply circuit for providing a continuous DC arc between two electrodes of an electric arc furnace comprising:

a three-phase AC power source for producing an AC current and an AC voltage;

transformer means having primary windings and secondary windings, the primary windings being connected to the AC power source;

first, second and third linear reactors having first and second terminals for producing a change in phase angle between AC current and AC voltage in response to a change in DC arc length to control the DC arc current and power input to the furnace, the first terminal of each of said reactors being connected to the secondary windings of the transformer means;

rectifier means having three input terminals and first and second output terminals, the rectifier means input terminals being connected to the second terminals of each of the linear reactors, one of said electrodes being connected to the first output terminal of said rectifier means; and a DC inductance having a first terminal connected to the second output terminal of said rectifier means and a second terminal connected to the second of said electrodes.

9. The power supply circuit as recited in claim 8 wherein the rectifier means is a diode rectifier means.

10. The power supply circuit as recited in claim 8 wherein the transformer means comprises a three-phase transformer.

11. The power supply circuit as recited in claim 10 wherein the rectifier means comprises a three-phase full-wave diode rectifier.

12. The power supply circuit as recited in claim 11 wherein the three-phase transformer includes delta-type primary and secondary windings.

13. The power supply circuit as recited in claims 1 or 8 wherein the distributed capacitance of the circuit elements is kept low to provide sufficient inductively stored energy to maintain the DC arc current substantially constant during perturbations of the DC arc in the arc furnace.

14. The power supply circuit as recited in claim 1 wherein the first, second and third linear reactors comprise air core reactors.

15. The power supply circuit as recited in claim 8 wherein the first, second and third linear reactors comprise air core reactors.

16. A power supply circuit for providing a continuous DC arc between two electrodes of an electric arc furnace, comprising:

an AC power source for producing an AC current an AC voltage;

transformer means having primary windings connected with the AC power source and secondary windings;

rectifier means having an AC input connected with the secondary windings of the transformer means and a DC output connected with the two electrodes of the furnace; and linear reactor means provided in series with the transformer means between the AC power source and the rectifier means for producing a change in phase angle between the AC current and AC voltage in response to a change in DC arc length to control the DC arc current and power input to the furnace.

17. The power supply circuit as recited in claim 2 wherein the linear reactor means is connected in series between the AC power source and the primary windings of the transformer means.

18. The power supply circuit as recited in claim 9 including at least second linear reactor means connected in series between the secondary windings of the transformer means and the AC input of the rectifier means.

19. The power supply circuit as recited in claim 2 wherein the linear reactor means is connected in series between the secondary windings of the transformer means and the AC input of the rectifier means.

20. The power supply circuit as recited in claim 2 wherein the DC inductance is connected in series between the DC output of the rectifier means and one of the electrodes.

21. The power supply circuit as recited in claim 2 wherein the rectifier means is a diode rectifier means.

* * * * *